United States Patent [19]

Libby

[11] 3,764,746

[45] Oct. 9, 1973

[54] ELECTROMAGNETIC TELEPHONE DATE COUPLER

[75] Inventor: Ross C. Libby, West Jefferson, Ohio

[73] Assignee: Design Elements, Inc., Columbus, Ohio

[22] Filed: Nov. 8, 1971

[21] Appl. No.: 196,311

[52] U.S. Cl. .................... 179/2 C, 179/1 C, 179/1 F

[51] Int. Cl. .................... H04m 1/00

[58] Field of Search .................... 179/1 C, 2 C, 2 DP, 179/1 F, 1 FS

[56] References Cited

UNITED STATES PATENTS

| | | | |
|---|---|---|---|
| 3,624,282 | 11/1971 | Salaman | 179/2 DP |
| 2,831,923 | 4/1958 | Block | 179/1 C |
| 2,165,546 | 7/1939 | Heller | 179/1 C |
| 3.009,991 | 11/1961 | Bekey | 179/1 F |

*Primary Examiner*—Kathleen H. Claffy
*Assistant Examiner*—Alan Faber
*Attorney*—Anthony D. Cennamo et al.

[57] ABSTRACT

A data coupler for coupling a data terminal to a telephone network without direct conductive connection. Data signals are electromagnetically coupled to the earpiece speaker of a telephone handset from an induction coil integrally molded in a sound muffling cup in which the earpiece of the handset is engaged. Automatic gain control is provided by a negative feedback loop having a microphone pickup mounted in the cup.

7 Claims, 2 Drawing Figures

Patented Oct. 9, 1973 3,764,746

INVENTOR.
ROSS C. LIBBY
BY
Cennamo Kremblas & Foster
ATTORNEYS

ELECTROMAGNETIC TELEPHONE DATE COUPLER

BACKGROUND OF THE INVENTION

This invention relates generally to data couplers and more particularly relates to an apparatus for detachably coupling a data terminal to a standard telephone handset.

A standard telephone network is often used for communications involving computers, teletype, facsimile or other digital data terminal equipment as well for as analogue data equipment such as slow scan T.V., electrocardiogram, and remote analogue control systems such as position controls, flow meters, and security systems. Digital data to or from the common teletype terminal is modulated on an audio frequency carrier. Signals from the terminal equipment are coupled to the telephone line by a data coupler. With some data couplers, the terminal is wired directly in conductive connection to the telephone transmission lines. Wires from the data terminal are connected directly to the telephone wires at a suitable junction box. A switching system is employed to permit use of the telephone network for data or speech messages.

In other systems, the data is acoustically coupled to the telephone lines. In a conventional acoustic coupler, outgoing signals from a terminal are converted by a suitable transducer to sound which is applied directly to the transmitter portion of a telephone handset. Similarly, incoming data is converted by the telephone handset speaker to sound and reconverted by the acoustic coupler to an electrical signal by means of a suitable microphone pickup mounted near the handset speaker.

Ordinarily, such an acoustic coupler is mounted in a cabinet having a pair of muffling cups which engage the mouth piece and earpiece ends of a telephone handset. The appropriate acoustic coupler transducers are positioned within these protective muffling cups and are free to transmit or receive their sound directly to or from the handset with reduced interference from exterior noises.

An advantage of the acoustic coupler is that no direct connections need be made to the telephone wires. The telephone handset is merely positioned on the acoustic coupler when the transmission of data is desired. Otherwise the telephone is free for normal use. Thus, all standard telephone handsets in private homes and pay telephones can communicate with remote highly sophisticated electronic equipment.

However, the acoustic coupler is subject to the disadvantages that it is subject to interference from noise created by surrounding disturbances. Additionally, it has a limited data transmission rate due to speaker and microphone distortion.

There is therefore a need for a coupler which offers the advantages of both the direct wire couplers and advantages of the acoustic coupler with accompanying higher speeds of transmission without having the disadvantages of the conventional acoustic couplers.

SUMMARY OF THE INVENTION

The invention is an apparatus for coupling a communication terminal to a transmission line where the transmission line has an electromagnetic-sound transducer connected thereto for normally converting signal energy between a sound state and an electronic signal state. The apparatus comprises an electromagnetic radiating means connected to the communication terminal and electromagnetically linked to said transducer for electromagnetically coupling a communication terminal signal directly from an electronic signal state in said terminal to an electronic signal state in said transducer.

It is therefore an object of the invention to provide an improved data coupler for any type of data (digital or analogue) and any modulation scheme (AM, PM, DPM, FM, FSK etc.)

Another object of the invention is to provide a data coupler which permits coupling to be attained by merely manually positioning a telephone handset on the acoustic coupler but which has improved noise and interference characteristics and improved data transmission rates.

Another object of the invention is to provide a data coupler having an automatic gain control which has feedback from the telephone equipment itself for controlling the signal level applied to the telephone network.

Further objects and features of the invention will be apparent from the following specification and claims when considered in connection with the accompanying drawings illustrating several embodiments of the invention.

Figure 1:
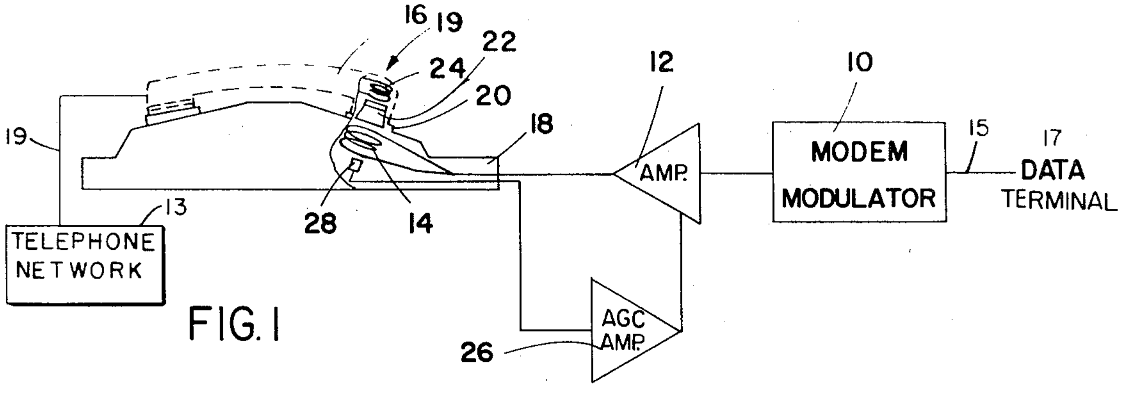
FIG. 1 is a diagrammatic view illustrating the principles of the invention.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose.

DETAILED DESCRIPTION

Referring to FIG. 1, data signals from the terminal equipment are applied to a modem 10 and modulated onto an audio frequency carrier. The modulated signal is then applied to an amplifier 12 to provide a low output impedance, high current signal which is appropriate to an induction coil 14 connected to the output of the amplifier 12. The communication terminal, telephone handset 16, conventionally connected to the telephone network 13 via transmission line 19, is removably mounted on the coupler cabinet 18. The earpiece end 19 of the handset 16 is sealingly engaged in a resilient rubber muffling cup 20. The earpiece end of the handset 16 contains a speaker 22 for normally converting telephone signal energy from an electronic signal state to sound. It has a coil 24 mounted in a magnetic field provided by a permanent magnetic in the conventional speaker structure. The microphone end of the telephone 16 is also sealingly engaged in a resilient rubber muffler cup 21, such as shown and claimed in U.S. Patent application Ser. No. 136,963, and having the same assignee.

An automatic gain control circuit 26 is provided to control the signal energy applied to the telephone network. It has a pickup means, such as a microphone 28, connected to its input and its output is connected to the amplifier 12. In operation, the modulated data from the output of the amplifier 12 is applied to the electromagnetic coil 14 which functions as an electromagnetic radiating means. The coil 14 is electromagnetically linked to the coil 24 of the speaker 22. In this manner, the signal energy is inductively coupled to the speaker coil 24 which is in turn conductively connected to the telephone network 13.

The data signal is not converted to sound by the coupler and then reconverted to electrical energy by the telephone handset in the conventional manner. It is therefore not subject to interference from exterior sounds or to distortion introduced by a speaker or microphone. The signal, instead, is converted through an intermediate electromagnetic signal state from an electronic signal state in the acoustic coupler to an electronic signal state in the telephone network conductors.

Because the coupled signal will be present in the speaker coil, even though by induction, it will additionally cause the speaker to move and generate a sound signal within the muffling cup 20. This sound will be picked up by the microphone 28 and its magnitude will be proportional to the energy coupled onto the telephone line. The signal from the microphone 28 is amplified by the automatic gain control amplifier 26 and applied to the amplifier 12 to control the gain of the system and to therefore maintain a stable signal power level on the telephone network line.

Figure 2:
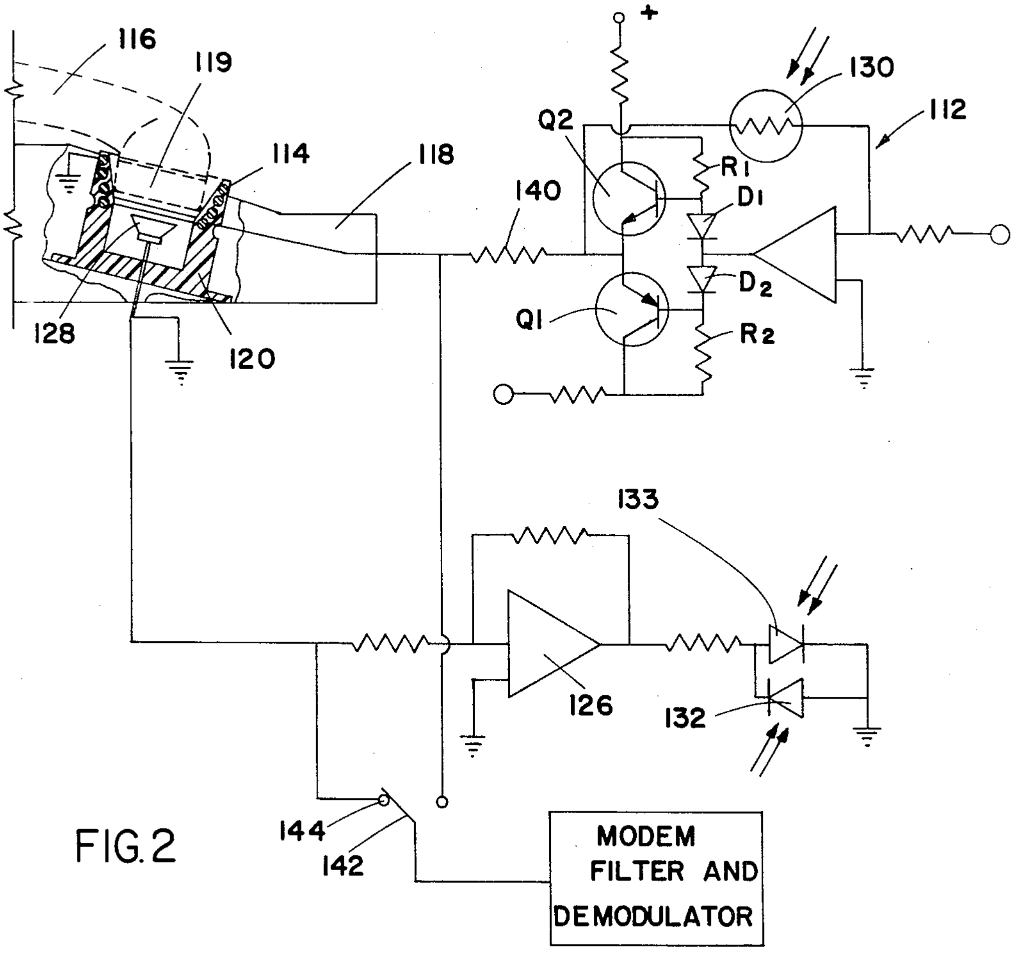
FIG. 2 is a schematic diagram illustrating more details of the preferred embodiment of the invention.

FIG. 2 shows the preferred embodiment in more detail. The coupler induction coil 114 is molded coaxially into the walls of the muffling cup 120. The muffling cup 120 is mounted in a cabinet 118 and sealingly receives the earpiece end 119 of the telephone handset 116. The amplifier 112 includes a pair of transistors $Q_1$ and $Q_2$ which provide a current boosting stage of low output impedance and additionally has a negative feedback photo-resistor 130. Diodes $D_1$ and $D_2$ and resistors $R_1$ and $R_2$ are provided to reduce distortion in the standard manner.

The automatic gain control microphone pickup 128 applies the signal it receives to an amplifier circuit 126, the output of which is applied to a pair of light emitting diodes 132 and 133. The light emitting diodes are physically positioned to direct their light onto the photo-resistor 130. A pair of diodes are preferred to obtain full wave operation although a single diode could be used for half wave operation or a single diode and a full wave rectifier could be used for full wave operation.

Thus, the AGC signal picked up by the microphone 128 is coupled to the amplifier 112 through the photo diodes 132 and 133 and the photo-resistor 130. This provides an advantage of not only isolation, but more importantly, makes the feedback signal for the automatic gain control polarity insensitive. A greater signal received at the microphone pickup 128 provides greater light emission from the light emitting diodes 132 and 133 and therefore reduces the resistance of the photo-resistor 130. This in turn, increases the feedback of the amplifier 112 thus tending to reduce its gain and stabilize the output signal power.

It should be noted that although the telephone handset transmitter is not normally used in this data coupler, nonetheless, it will require muffling to prevent interference by outside sounds. Therefore, it is desirable that a passive muffler cup also be sealingly engaged to the microphone end of the handset. This muffler cup may be identical with the muffler cup 120 illustrated in FIG. 2 except that it will not require the coil 114 or the microphone pickup 128.

In order to permit duplex operation (simultaneous transmitting and receiving on different carrier frequencies), if desired, a resistance 140 is inserted in the output circuit of the transistors $Q_1$ and $Q_2$ and the modem filter and demodulator is selectably connected to the coil 114 through a single pole-double throw switch 142. The resistance 140 is sufficiently large that the coil 114 sees a constant current generator which will not shunt the incoming signals. The incoming signals are simultaneously inductively coupled from the handset speaker to the coil 114.

The other contact 144 of the switch 142 may, if desired, be connected to the output of the microphone 128. This permits use of the microphone 128 to receive incoming data if the data coupler were used with a handset having a crystal rather than a magnetically operated earpiece speaker.

Several experiments were performed and are included as examples. First, an acoustic coupler induction coil was prepared having a 2 inch diameter and 5 turns of wire. This coil was positioned with approximately a ¼ inch clearance around a telephone handset speaker. A 2 millivolt peak to peak input voltage was applied to the induction coil which drew a current of 8 milliamps peak to peak. The voltage measured at the terminals of the unloaded speaker was 5 millivolts peak to peak. The speaker was then loaded with a 150 ohm resistance and the speaker voltage was found to be approximately 2.5 millivolts peak to peak. The 150 ohm resistance represents the approximate characteristic impedance of the telephone hybrid transformer which couples the handset to 600 Ω transmission line.

An induction coil having a 4 inch diameter and 3 turns of wire was then prepared. This was positioned with approximately a 1 inch clearance around the speaker and a voltage of 3 millivolts peak to peak was applied to the induction coil which drew a current of 8 milliamps peak to peak. A voltage at the unloaded speaker was measured and found to be 2 millivolts peak to peak.

A coil was finally prepared having an approximate diameter of 3 inches and having 400 turns of wire. This coil was positioned with approximately a ½ inch clearance around the telephone handset speaker. An input voltage of 5 volts peak to peak was applied to the induction coil and it was found to produce a 200 millivolt peak to peak voltage at the terminals of the unloaded speaker. Then, applying approximately the same input voltage to the induction coil, the input signal was coupled to a telephone handset speaker which was connected to the telephone network. A clear and audible tone was heard at a remote telephone connected to the input telephone handset.

With the 400 turn induction coil, the frequency response was found to be relative flat from 100 Hz to 4KHz. Thus, for use in a data coupler, an induction coil of approximately 400 turns would advantageously be molded into the resilient rubber muffling cup which is sealingly engaged with the earpiece of the telephone handset.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. An apparatus for coupling a communication terminal to a telephone network, the network having an electromagnetic-sound telephone speaker connected thereto for normally converting signal energy between a sound state and an electronic signal state, the telephone speaker mounted in a telephone handset, said apparatus comprising an electromagnetic radiating means connected to said communication terminal and electromagnetically linked to said speaker for electromagnetically coupling a communication terminal signal directly from an electronic signal state in said terminal to an electronic signal state in said speaker; a sound muffling cup in which the handset is removably mounted; a sound pickup means mounted in said cup for receiving sound signals generated by the movement of said speaker, and wherein an automatic gain control circuit is connected to said pickup means and to said communication terminal for providing negative feedback to control the magnitude of the signal coupled to said telephone network.

2. An apparatus according to claim 1 wherein said speaker includes a speaker coil, said radiating means comprises an induction coil electromagnetically linked to said speaker coil, and said communication terminal comprises a data terminal.

3. An apparatus according to claim 2 wherein said speaker is mounted in a telephone handset, the handset is removably mounted in a sound muffling cup, and said induction coil is mounted to said cup.

4. An apparatus according to claim 3 wherein said induction coil is molded into the walls of said cup.

5. An apparatus according to claim 1 wherein said cup is a generally cylindrically walled resilient cup sealingly engaging a rim of said handset around said speaker and wherein said induction coil is molded coaxially into the walls of said cup.

6. An apparatus according to claim 5 wherein a second muffler cup sealing engages the mouthpiece portion of said handset for preventing any sound energy from being coupled into the mouthpiece.

7. An apparatus according to claim 2 wherein a modem filter and demodulator is connected to said induction coil for coupling incoming data to said data terminal.

* * * * *